(12) United States Patent
Lichtenhan et al.

(10) Patent No.: US 7,612,143 B2
(45) Date of Patent: Nov. 3, 2009

(54) METALLIZED NANOSTRUCTURED CHEMICALS ALLOYED INTO POLYMERS

(75) Inventors: Joseph D. Lichtenhan, Petal, MS (US); Xuan Fu, Purvis, MS (US); Joseph J. Schwab, Huntington Beach, CA (US); Paul Wheeler, Hattiesburg, MS (US); Hendrikus C. L. Abbenhuis, Eindhoven (NL)

(73) Assignee: Hybrid Plastics, Inc., Hattiesburg, MS (US)

( * ) Notice: Subject to any disclaimer, the term of this patent is extended or adjusted under 35 U.S.C. 154(b) by 570 days.

(21) Appl. No.: 11/466,053

(22) Filed: Aug. 21, 2006

(65) Prior Publication Data

US 2008/0262162 A1    Oct. 23, 2008

Related U.S. Application Data (63) Continuation-in-part of application No. 11/225,607, filed on Sep. 12, 2005, now Pat. No. 7,553,904, which is a continuation-in-part of application No. 11/166,008, filed on Jun. 24, 2005, now abandoned, which is a continuation-in-part of application No. 09/631,892, filed on Aug. 4, 2000, now Pat. No. 6,972,312, and a continuation-in-part of application No. 10/351,292, filed on Jan. 23, 2003, now Pat. No. 6,933,345, which is a continuation-in-part of application No. 09/818,265, filed on Mar. 26, 2001, now Pat. No. 6,716,919, which is a continuation-in-part of application No. 09/747,762, filed on Dec. 21, 2000, now Pat. No. 6,911,518, and a continuation-in-part of application No. 10/186,318, filed on Jun. 27, 2002, now Pat. No. 6,927,270.

(60) Provisional application No. 60/709,638, filed on Aug. 19, 2005, provisional application No. 60/608,582, filed on Sep. 10, 2004, provisional application No. 60/147,435, filed on Aug. 4, 1999, provisional application No. 60/351,523, filed on Jan. 23, 2002, provisional application No. 60/192,083, filed on Mar. 24, 2000, provisional application No. 60/171,888, filed on Dec. 23, 1999, provisional application No. 60/301,544, filed on Jun. 27, 2001.

(51) Int. Cl.
C08F 8/00 (2006.01)

(52) U.S. Cl. .................. 525/101; 525/403; 525/431; 525/446; 525/450; 525/453; 525/464; 525/474; 525/476; 525/479

(58) Field of Classification Search ............ 525/101, 525/403, 431, 446, 450, 453, 464, 474, 476, 525/479

See application file for complete search history.

(56) References Cited

U.S. PATENT DOCUMENTS

| 5,047,492 | A |   | 9/1991  | Weidner et al.               |
|-----------|---|---|---------|------------------------------|
| 5,194,928 | A | * | 3/1993  | Cronin et al. ........ 257/629 |
| 5,412,053 | A |   | 5/1995  | Lichtenhan et al.            |
| 5,484,867 | A |   | 1/1996  | Lichtenhan et al.            |
| 5,589,562 | A |   | 12/1996 | Lichtenhan et al.            |
| 5,939,576 | A |   | 8/1999  | Lichtenhan et al.            |
| 5,942,638 | A |   | 8/1999  | Lichtenhan et al.            |
| 6,057,035 | A |   | 5/2000  | Singh et al.                 |
| 6,100,417 | A |   | 8/2000  | Lichtenhan et al.            |
| 6,194,485 | B1|   | 2/2001  | Hogan et al.                 |
| 6,716,919 | B2|   | 4/2004  | Lichtenhan et al.            |
| 6,767,930 | B1|   | 7/2004  | Svejda et al.                |
| 6,933,345 | B1|   | 8/2005  | Lichtenhan et al.            |
| 2002/0052434 | A1 | * | 5/2002 | Lichtenhan et al. ..... 524/261 |
| 2002/0137625 | A1 | * | 9/2002 | Jost et al. ............. 502/158 |
| 2003/0018109 | A1 |   | 1/2003 | Hsiao et al.                 |
| 2004/0097663 | A1 |   | 5/2004 | Deforth et al.               |
| 2005/0192364 | A1 | * | 9/2005 | Lichtenhan et al. ........ 521/50 |

FOREIGN PATENT DOCUMENTS

| EP | 121053        | 10/1984    |
| EP | 967229        | 12/1999    |
| WO | WO 97/24344   | 7/1997     |
| WO | WO 98/46352   | 10/1998    |
| WO | WO 99/03581   | 1/1999     |
| WO | WO 03/082465  | 10/2003    |
| WO | WO 2007/040870 | * 12/2007 |
| WO | WO 2007/041344 | * 12/2007 |

OTHER PUBLICATIONS

Zhang, et al, "Effect of Methyl Methacrylate/Polystyrene and Poly(methyl methacrylate) Blends", *Macromolecules*, (2002), vol. 35, pp. 8029-8038.

Billmeyer, *Textbook of Polymer Science*, 3rd Ed., Wiley & Sons, New York, (1984), Chapter 6, pp. 471-472.

Fina, et al., "Metal Functional POSS As Fire Retardants in Polypropylene" *Polymer Degradation and Stability*, (2006), pp. 1-7.

Haddad, et al., "The Incorporation of Transition Metals into Polyhedral Oligosilsesquioxane Polymers", *J. Inorganic. Organomet. Polm.*, (1995), vol. 5, No. 3, pp. 237.

Hansen, et al., The Dynamic Status Quo of Polyhedral Silsequioxane Coordination Chemistry, *Euro. J. Inorg. Chem.*, (2004), pp. 675-683.

Hansen et al., "Synthesis, Structural Characterization and Transmetalation Reactions of a Tetranuclear Magnesium Silsequioxane Complex", *Inorganic Chem.*, (2001), vol. 40, pp. 4049-4052.

Lee, et al., "New Approach in the Synthesis of Hybrid Polymers Grafted with Polyhedral Oligomeric Silsequioxane and Their Physical and Viscoelastic Properties", *Macromolecules*, vol. 38, (2005), pp. 438-444.

(Continued)

*Primary Examiner*—Bernard Lipman
(74) *Attorney, Agent, or Firm*—David H. Jaffer; Pillsbury Winthrop Shaw Pittman LLP (57) ABSTRACT

Metallized nanostructured chemicals are incorporated at the molecular level as alloying agents for the reinforcement of polymer microstructures, including polymer coils, domains, chains, and segments. Direct blending processes are effective because of the tailorable compatibility of the metallized nanostructured chemicals with polymers.

20 Claims, 10 Drawing Sheets

OTHER PUBLICATIONS

Lichtenhan, et al., "Modern Ablatives. The Design Development and Application of Hybrid Polymers", *The Adv. Polymeric Components Symposium Proc.*, JJ Rusek editor, (1993), PL-TR-92-3018, Part 2, vol. 3, pp. 475-485.

Murugavel, et al., "Discrete Silanetrols: Building Blocks for Three Dimensional Metallasiloxanes", *Accounts of Chemical Res.*, (1996), vol. 29, pp. 183-189.

Shchegolikhina, et al., "Synthesis and Properties of Stereoregular Cyclic Polysilanols . . . ", *Inorganic Chem.*, (2002), vol. 41, pp. 6892-6904.

Zhang, et al, "Effect of Methyl Methacrylate/Polystyrene and Poly(methyl methacrylate) Blends", *Macromolecules*, (2002), vol. 35, pp. 8029-8038.

International Search Report issued Jul. 23, 2008 in corresponding PCT/US2006/032651.

* cited by examiner

$([(RSiO_{1.5})_6 (RSiO_2)_2 ML]\Sigma_9)_n$ $[(RSiO_{1.5})_4 (RSiO_2)_2 (RSiOSiR_3)M]\Sigma_9 [(O_2ML)_2]\Sigma_4 [M(RSiOSiR_3)(RSiO_2)_2(RSiO_{1.5})_4]\Sigma_9$ $([(RSiO_{1.5})_4 (RSiO_2)_3]\Sigma_7 [M_2(ML)_2]\Sigma_4 [(RSiO_{1.5})_4 (RSiO_2)_3]\Sigma_7$

Aliphatic carbonate component

METALLIZED NANOSTRUCTURED CHEMICALS ALLOYED INTO POLYMERS

CROSS-REFERENCE TO RELATED APPLICATIONS

This application claims priority from U.S. Provisional Patent Application Ser. No. 60/709,638 filed Aug. 19, 2005, and is a continuation-in-part of U.S. patent application Ser. No. 11/225,607 filed Sep. 12, 2005 now U.S. Pat. No. 7,553,904 (which claims priority from U.S. Provisional Patent Application Ser. No. 60/608,582 filed Sep. 10, 2004), which is a continuation-in-part of U.S. patent application Ser. No. 11/166,008 filed Jun. 24, 2005, now abandoned, which is (a) a continuation-in-part of U.S. patent application Ser. No. 09/631,892 filed Aug. 4, 2000, now U.S. Pat. No. 6,972,312 (which claims priority from U.S. Provisional Patent Application Ser. No. 60/147,435, filed Aug. 4, 1999); (b) a continuation-in-part of U.S. patent application Ser. No. 10/351,292, filed Jan. 23, 2003, now U.S. Pat. No. 6,933,345 (which claims priority from U.S. Provisional Patent Application Ser. No. 60/351,523, filed Jan. 23, 2002), which is a continuation-in-part of U.S. patent application Ser. No. 09/818,265, filed Mar. 26, 2001, now U.S. Pat. No. 6,716,919 (which claims priority from U.S. Provisional Patent Application Ser. No. 60/192,083, filed Mar. 24, 2000); (c) a continuation-in-part of U.S. patent application Ser. No. 09/747,762, filed Dec. 21, 2000, now U.S. Pat. No. 6,911,518 (which claims priority from U.S. Provisional Patent Application Ser. No. 60/171,888, filed Dec. 23, 1999); and (d) a continuation-in-part of U.S. patent application Ser. No. 10/186,318, filed Jun. 27, 2002, now U.S. Pat. No. 6,927,270 (which claims priority from U.S. Provisional Patent Application Ser. No. 60/301,544, filed Jun. 27, 2001). The disclosures of the foregoing applications are incorporated herein by reference.

FIELD OF THE INVENTION

This invention relates generally to methods for enhancing the physical properties of a polymer and, more particularly, to methods for alloying a metallized nanostructured chemical into a polymer to enhance the properties of the polymer.

BACKGROUND OF THE INVENTION

It has long been recognized that the properties of polymers can be controlled to a high degree through variables such as morphology, composition, thermodynamics and processing conditions. It is similarly known that various sizes and shapes of fillers (e.g. calcium carbonate, silica, carbon black, rubber, etc.) can be inserted or compounded into a polymer to somewhat control both polymer morphology and the resulting physical properties.

Figure 1:
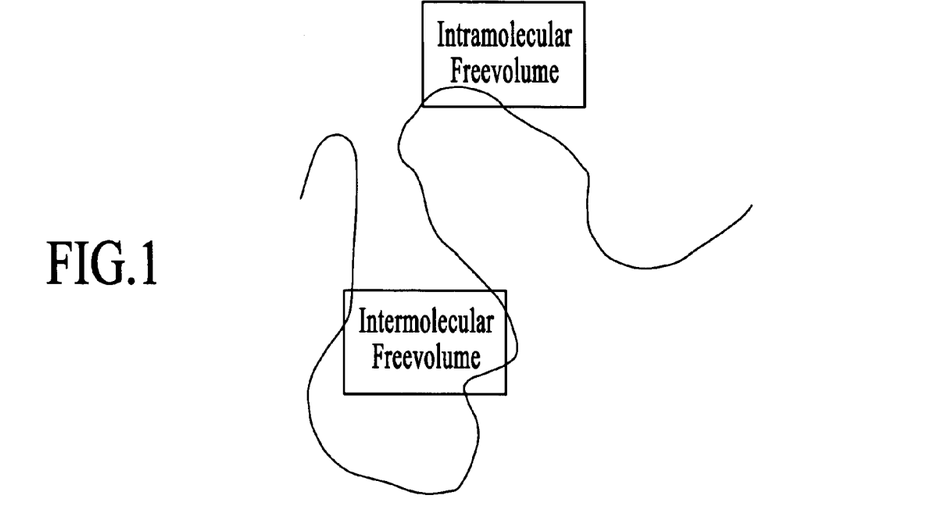
FIG. 1 shows the relative positions of an internal free volume and an external free volume of a polymer.

In their solid state, all polymers (including amorphous, semi-crystalline, crystalline, rubber, etc.) possess considerable amounts of internal and external free volume (see FIG. 1). The free volume of a polymer has a tremendous impact on its physical properties, since it is within this volume that the dynamic properties (e.g. reptation, translation, rotation, crystallization) of polymer chains primarily operate and in turn influence fundamental physical properties such as density, thermal conductivity, glass transition, melt transition, modulus, relaxation, stress transfer, and surface properties.

Figure 2:
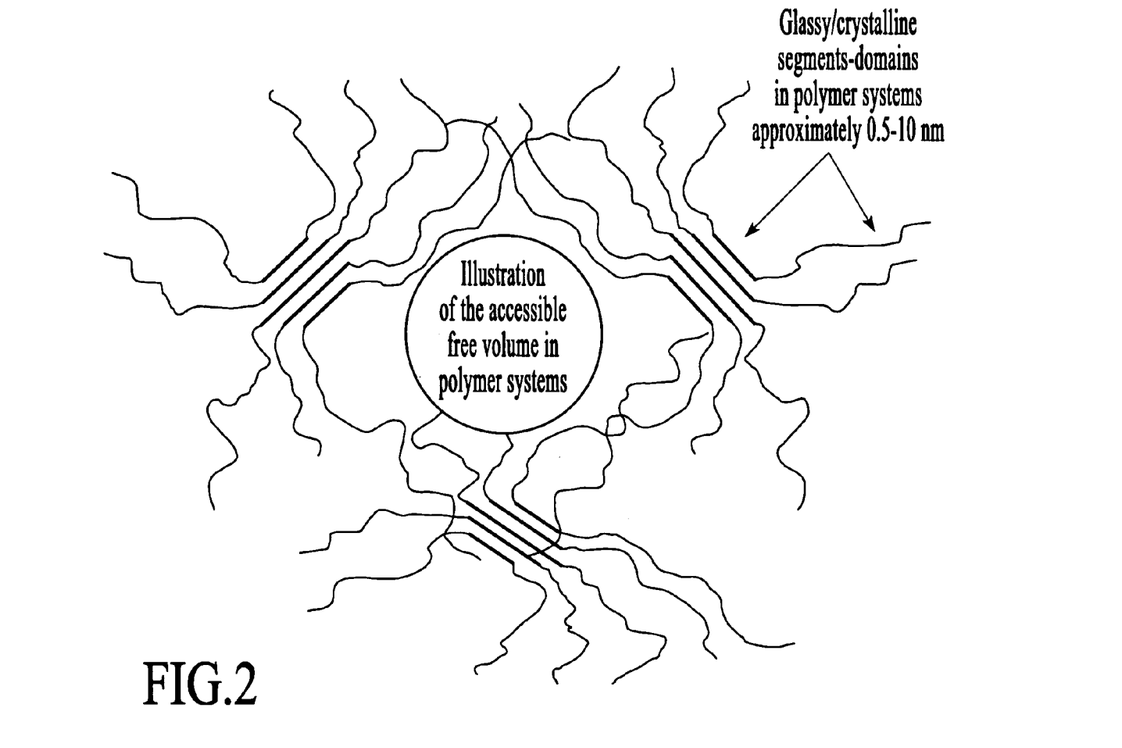
FIG. 2 illustrates different regions of phase separated polymer microstructure.

The accessibility of free volume in a polymer system depends greatly on its morphology. As shown in FIG. 2, for example, denser regions and phase separation within a polymer can both increase and decrease the thermodynamic and kinetic access to such areas. Because of its influence on thermodynamic and kinetic properties, polymer morphology is a major factor that limits the ability of conventional fillers from accessing the free volume regions in a polymer system. Additional processing/compounding effort is normally required to force compatibilization between a filler and a polymer system because conventional fillers are physically larger than most polymer dimensions, are chemically dissimilar, and usually are high melting solids.

Prior art in compounding has focussed on incorporating polymer systems with small, low molecular weight molecules (liquids and solids) known as plasticizers or plasticizing agents and with macro, micro and nanoscale particulates of dissimilar composition (e.g. inorganic) to that of the polymer (organic). The function of a plasticizing agent is to aid in the slippage of polymer chains by one another, thus improving the processability and manufacturability of a particular polymer system. Similarly fillers, which have traditionally been composed of fibrous or particulate solids, have been combined with polymers to enhance physical properties such as dimensional stability, impact resistance, tensile and compressive strengths, and thermal stability. Unfortunately, where plasticizers are too small to reinforce polymer chains, traditional fillers are too large to reinforce individual polymer chains and segments. Fillers are traditionally utilized to macroscopically reinforce large associated or nearby groups of polymers rather than the individual chains and segments within these polymers.

It has been calculated that as filler sizes decrease below 50 nm, they become more resistant to sedimentation and are more effective at providing reinforcement to polymer systems and consequently improving control over physical properties. The full application of this theoretical knowledge, however, has been thwarted by the lack of a practical source of particulates with monodispersity and diameters below the 50 nm range and especially at or below the 10 nm range. Particularly desirable are metallic particles that are monodisperse or which have controlled and narrow particle size distributions as these are expected to form the most stable dispersions within polymer systems. In addition, these particles would be well below the length scale necessary to scatter light and hence should appear transparent when compounded into plastics.

Recent developments in nanoscience have now enabled the ability to cost effectively manufacture commercial quantities of materials that are best described as metallized nanostructured chemicals due to their specific and precise chemical formula, hybrid (inorganic-organic) chemical composition, and large physical size relative to the size of traditional chemical molecules (0.3-0.5 nm) and relative to larger sized traditional fillers (>50 nm).

Figure 3:
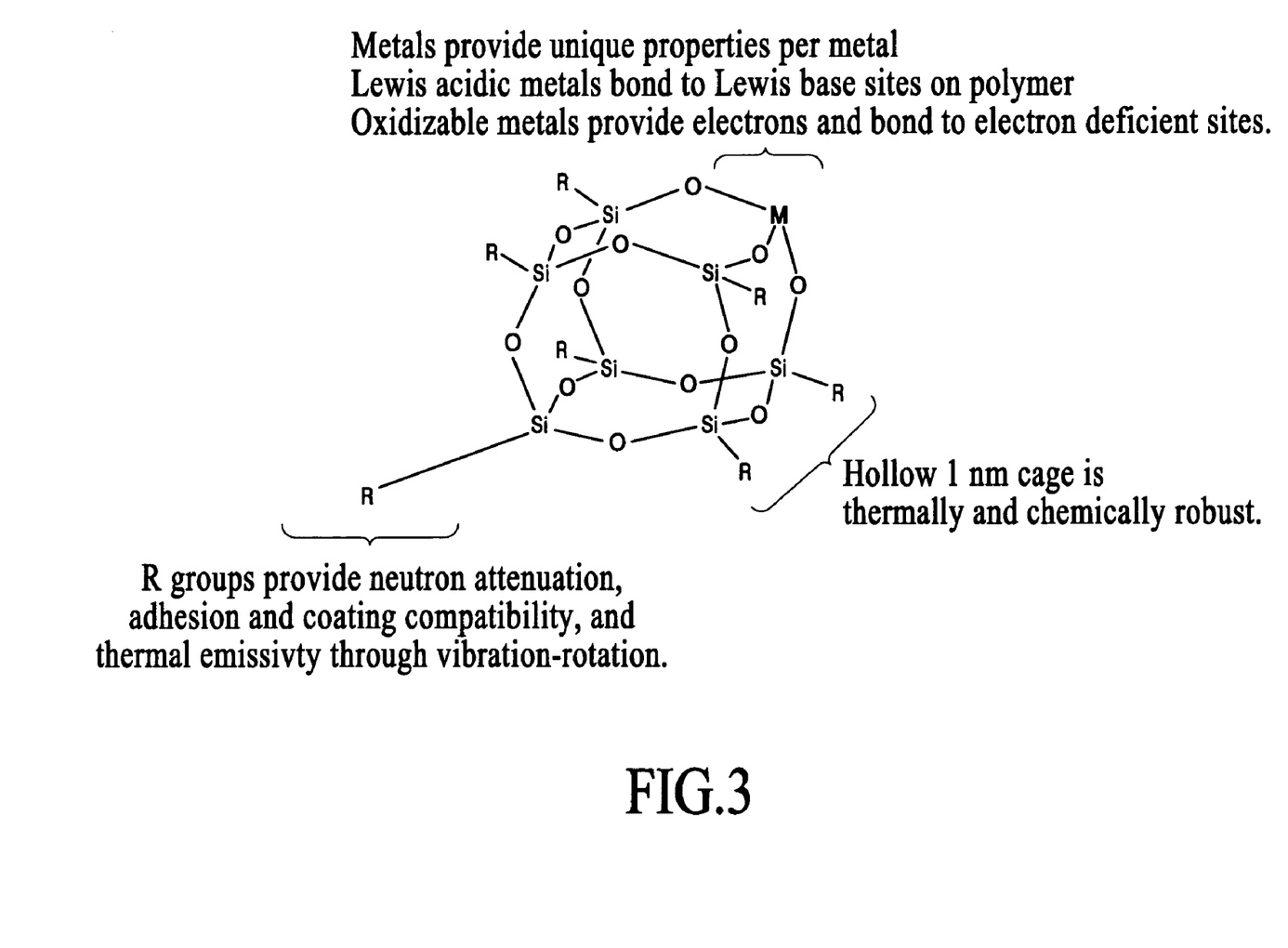
FIG. 3 illustrates a sample POMS nanostructure $[(RSiO_{1.5})_4(RSiO_2)_3M]\Sigma_8)$.
Figure 4:
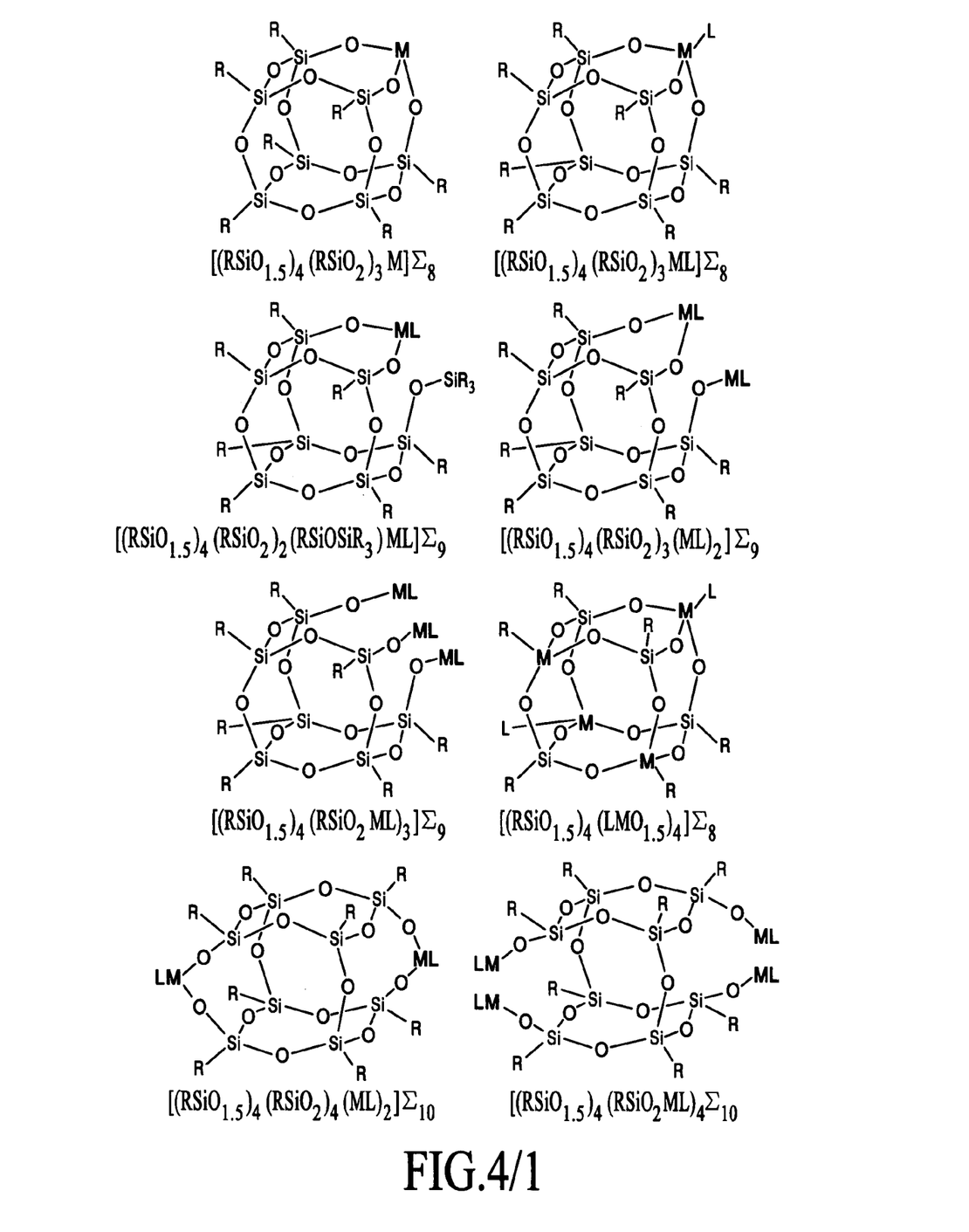
FIG. 4 illustrates representative structures for POMS nanostructured chemicals.

Nanostructured chemicals can be based on low-cost Polyhedral Oligomeric Silsesquioxanes (POSS) and Polyhedral Oligomeric Silicates (POS). Metallized nanostructured chemicals which are also known as Polyhedral Oligomeric Metallosesquioxanes (POMS) are cages that contain one or more metals inside or outside or bonded to the cage. In certain instances cages may contain more than one metal atom, or types of metal atoms or metal alloys. POMS are illustrated by the representative structure and formula shown in FIG. 3. Note that POMS are structurally and compositionally diverse and may contain several polyhedra, polymorphs, and compositional variances that can be utilized to control the physical properties of the POMS and the materials into which they are incorporated (FIG. 4).

Like POSS cages, POMS systems contain hybrid (i.e. organic-inorganic) compositions in which the internal frameworks are primarily comprised of inorganic silicon-oxygen bonds. The exterior of a nanostructure is covered by both reactive and nonreactive organic functionalities (R), which ensure compatibility and tailorability of the nanostructure with organic polymers. These and other properties of metallized nanostructured POSS chemicals are discussed in U.S. Pat. No. 5,589,562 and by Hanssen, van Santen, and Abbenhuis, 2004 *Eur. J. Inorg. Chem.* 675-83, both incorporated herein by reference. Unlike metal fillers or particulate fillers, these POMS nanostructured chemicals are of low density (range 1.17 g/ml to 2.04 g/ml); highly dispersible into polymers and solvents; exhibit excellent inherent fire retardancy; optical, electronic properties, and radiation tolerance; and can range in diameter from 0.5 nm to 50 nm.

Prior art associated with fillers, plasticizers, and polymer morphology has not been able to adequately control polymer chain, coil and segmental motion, optical and electronic properties at a molecular level. Furthermore, the mismatch of chemical potential (e.g. solubility, miscibility, etc.) between hydrocarbon-based polymers and inorganic-based fillers resulted in a high level of heterogeneity in compounded polymers that is akin to oil mixed with water. Therefore, there exists a need for appropriately sized metal containing agents for polymer systems with precisely controlled diameters (nanodimensions), distributions and with tailorable chemical functionality. In addition, it would be useful to have easily compoundable metallized nanoreinforcements that have chemical potential (miscibility) ranges similar to the various polymer systems.

SUMMARY OF THE INVENTION

The present invention describes methods of preparing new polymer compositions by compounding metallized nanostructured chemicals into polymers. The resulting nano-alloyed polymers, are wholly useful by themselves, in combination with other polymers, or in combination with macroscopic reinforcements such as fiber, clay, glass mineral, nonmetallized POSS cages, metal particulates, and other fillers including diamond dust. The nano-alloyed polymers are particularly useful for producing polymeric compositions with desirable physical properties such as adhesion to polymeric, composite and metal surfaces; water repellency; reduced melt viscosity; low dielectric constant; resistance to abrasion and fire; biological compatibility; lubrication; gas diffusion control; chemical resistance; and optical quality plastics.

The preferred compositions contain two primary material combinations: (1) metallized nanostructured chemicals, metallized nanostructured oligomers, or metal containing nanostructured polymers from the chemical classes of polyhedral oligomeric silsesquioxanes, polyhedral oligometallasilsesquioxanes, polyhedral oligomeric silicates, polyhedral oligometallosilicates, polyoxometallates, metallized fullerenes, carboranes, boranes, and polymorphs of carbon; and (2) traditional amorphous polymer systems such as acrylics, carbonates, epoxies, esters, silicones, polyolefins, polyethers, polyesters, polycarbonates, polyamides, polyurethanes, polyimides, and polymers containing functional groups, or traditional semicrystalline and crystalline polymer systems such as styrenics, amides, nitriles, olefins, aromatic oxides, aromatic sulfides, and esters, ionomers, or traditional rubbery polymer systems as derived from hydrocarbons and silicones.

The compounding of metallized nanostructured chemicals into polymers is preferably accomplished via blending into the polymer system of interest with the metallized nanostructure. All types and techniques of blending, including melt blending, dry blending, solution blending, and reactive and nonreactive blending are effective.

In addition, selective incorporation of nanostructured chemicals into a specific region of a polymer can be accomplished by compounding into the polymer a metallized nanostructured chemical with a chemical potential (miscibility) compatible with the chemical potential of the region within the polymer to be alloyed. In a similar manner the metallized nanostructure may be encouraged to associate with a specific region of the polymer because of the presence of reactive groups on the polymer with the metal contained in the nanostructure. Reactive groups typically incorporated into polymers include olefins, cyanates, acrylates, amines, amides, alcohols, carbohydrates, esters, acids, nitrites and boron. The Lewis basicity of these groups provide an association with the metallized nanostructures' inherent Lewis acidity.

Because of their chemical nature, metallized nanostructured chemicals can be tailored to show compatibility or incompatibility with nearly all polymer systems. Their physical size in combination with their tailorable compatibility enables metallized nanostructured chemicals to be selectively incorporated into plastics and control the dynamics of coils, blocks, domains, and segments, and subsequently favorably impact a multitude of physical properties. Properties favorably improved are time dependent mechanical and thermal properties such as heat distortion, creep, compression set, strength, toughness, visual appearance, feel and texture, CTE, electrical, radiation, and oxidation stability, shrinkage, modulus, hardness, and abrasion resistance. In addition to mechanical properties, other physical properties favorably improved include biological compatibility, antimicrobial activity, thermal and electrical conductivity, adhesion, surface lubrication, laser-marking, fire resistance, gas and moisture permeation control, and paint, print, film and coating properties.

DEFINITION OF FORMULA REPRESENTATIONS FOR NANOSTRUCTURES

For the purposes of understanding this invention's chemical compositions the following definitions for formula representations of Polyhedral Oligomeric Silsesquioxane (POSS), Polyhedral Oligomeric Silicate (POS), and Polyhedral Oligomeric Metallasesquioxane (POMS), and Polyhedral Oligomeric MetalloSilicate are made.

Polysilsesquioxanes are materials represented by the formula [RSiO$_{1.5}$]$_\infty$ where $\infty$ represents molar degree of polymerization and R=represents organic substituent (H, siloxy, cyclic or linear aliphatic or aromatic groups that may additionally contain reactive functionalities such as alcohols, esters, amines, ketones, olefins, ethers or halides). Polysilsesquioxanes may be either homoleptic or heteroleptic. Homoleptic systems contain only one type of R group while heteroleptic systems contain more than one type of R group.

[(RSiO$_{1.5}$)$_n$]$_{\Sigma\#}$ for homoleptic compositions

[(RSiO$_{1.5}$)$_n$(R'SiO$_{1.5}$)$_m$]$_{\Sigma\#}$ for heteroleptic compositions (where R≠R')

[(RSiO$_{1.5}$)$_n$(RXSiO$_{1.0}$)$_m$]$_{\Sigma\#}$ for functionalized heteroleptic compositions (where R groups can be equivalent or inequivalent)

[(RSiO$_{1.5}$)$_n$(RSiO$_{1.0}$)$_m$(M)$_j$]$_{\Sigma\#}$ for heterofunctionalized heteroleptic compositions

[(RSiO$_{1.5}$)$_n$(RSiO$_{1.0}$)$_m$(ML)$_j$]$_{\Sigma\#}$ for heterofunctionalized heteroleptic compositions In all of the above R is the same as defined above and X includes but is not limited to OLi, ONa, OK, OH, Cl, Br, I, alkoxide (OR), acetate (OOCR), peroxide (OOR), amine (NR$_2$) isocyanate (NCO), and R. The symbol M refers to metallic elements within the composition that include low and high atomic number metals, s and p block metals, d and f block metals including transition, lanthanide, actinide metals. In particular Al, B, Ga, Gd, Ce, W, Fe, Ni, Eu, Y, Zn, Mn, Os, Ir, Ta, Cd, Cu, Ag, V, As, Tb, In, Ba, Ti, Sm, Sr, Pb, Lu, Cs, Tl, Te. The symbol ML represents a metal as defined above and a (L) ligand coordinated to the metal. A variety of ligands may coordinate to the metal in a covalent fashion to maintain proper oxidation state or in a dative fashion to maintain coordination sphere electronics of the metal atom. For example transition metals containing s,p,d orbitals generally prefer electron counts of eighteen at the metal center whereas actinide and lanthanides can exceed this rule due to the presence of f orbitals. Typical L groups include solvent molecules such as tetrahydrofuran, pyridine, water, or alkoxides, amides, oxides, and halides. The symbols m, n and j refer to the stoichiometry of the composition. The symbol $\Sigma$ indicates that the composition forms a nanostructure and the symbol # refers to the number of silicon atoms contained within the nanostructure. The value for # is usually the sum of m+n, where n ranges typically from 1 to 24 and m ranges typically from 1 to 12. It should be noted that $\Sigma$# is not to be confused as a multiplier for determining stoichiometry, as it merely describes the overall nanostructural characteristics of the system (aka cage size).

DETAILED DESCRIPTION OF THE INVENTION

The present invention describes the use of metallized nanostructured chemicals (POMS) as alloying agents for the enhancement of polymeric properties via the incorporation of metal atoms and reinforcement of polymer coils, domains, chains, and segments at the molecular level.

The keys that enable POMS to function as molecular level reinforcing and alloying agents are: (1) their unique size with respect to polymer chain dimensions, and (2) their ability to be compatibilized with polymer systems to overcome repulsive forces that promote incompatibility and expulsion of the nanoreinforcing agent by the polymer chains. That is, metallized nanostructured chemicals can be tailored to exhibit preferential affinity/compatibility with polymer microstructures through variation of the R groups on each nanostructure. The metallized nanostructure may be encouraged to associate with a specific region of the polymer because of the presence of reactive groups on the polymer with the metal contained in the nanostructure. Reactive groups typically incorporated into polymers include acrylates, amines, amides, alcohols, esters, nitriles and boron. The Lewis basicity of these groups provide an association site for the metal atom in the nanostructure as it is inherent a Lewis acid.

Conversely, POMS can be tailored to be incompatible with microstructures within a polymer, thus allowing for selective reinforcement of specific polymer microstructure or migration to the surfaces of such polymers for modification of surface properties. Therefore, the factors to effect a selective nanoreinforcement include specific nanosizes of metallized nanostructured chemicals, distributions of nanosizes, and incompatibilities and disparities between the R groups on the POMS and the polymer the types of functionality present in the specific polymer system.

Metallized nanostructured chemicals, such as the POMS structures illustrated in FIG. 4, are available as both solids and oils. The physical form is largely controlled by the type of R group on each cage and the topology of the structures. For example POMS with rigid structure or rigid R groups will generally render crystalline solids. Both crystalline and amorphous POMS dissolve in solvents, monomers, and molten polymers thus solving the long-standing dispersion problem associated with traditional particulate fillers. Moreover, because POSS and POMS dissolve in plastics at the molecular level, the forces (i.e. free energy) from solvation/mixing are sufficient to prevent the cages from coalescing and forming micron sized agglomerated domains as occurs with traditional and other organofunctionalized fillers. Agglomeration of particulate fillers has been a problem that has traditionally plagued compounders and molders.

Table 1 lists the size range of POSS relative to polymer dimensions and filler sizes. The size of POSS is roughly equivalent to that of most polymer dimensions, thus at a molecular level POSS can effectively alter the motion of polymer chains which favorably impacts physical properties.

TABLE 1

Relative size and length scale of POSS, polymer dimensions, and fillers.

| Material Type | Length Scale |
| --- | --- |
| Amorphous Polymer Segments | 0.5-5 nm |
| Octacyclohexyl POSS | 1.5 nm |
| Random Polymer Coils | 5-10 nm |
| Colloidal Silica | 9-80 nm |
| Crystalline Lamellae | 1.0-9,000 nm |
| Fillers/Organoclays | 2-100,000 nm |

The physical size of POSS and POMS is critical to it ability of POSS to control chain motion. This is particularly apparent when POSS is grafted onto a polymer chain. See U.S. Pat. Nos. 5,412,053; 5,484,867; 5,589,562; and 5,047,492, all incorporated by reference. When POSS nanostructures are incorporated into a polymer they act to retard chain motion and greatly enhance time dependent properties such as $T_g$, HDT, Creep and Set, which correlate to increased modulus, hardness, and abrasion resistance, lubricity, hydrophobicity and surface properties. The present invention demonstrates that additional property enhancements can be realized by the incorporation of metallized nanostructured chemicals into plastics. This greatly simplifies the prior art processes and affords a greater degree of property control as a direct result of the incorporation of metal atoms into the resulting material.

Furthermore, because metallized nanostructured chemicals possess spherical shapes (per single crystal X-ray diffraction studies) like molecular spheres, and because they dissolve, they are also effective at reducing the viscosity of polymer systems. This benefit is similar to what is produced through the incorporation of plasticizers into polymers, yet with the added benefits of reinforcement of the individual polymer chains due to the nanoscopic nature of the entity. Thus, ease of processability and reinforcement effects are obtainable through the use of POMS where prior art would have required the use of both POSS and metal fillers. Furthermore, cost and weight advantages are realized as metal fillers are more dense than POMS and in many cases the properties of the atom are desired rather than any inherent property of the metallic particle.

EXAMPLES

General Process Variables Applicable to All Processes

As is typical with chemical processes there are a number of variables that can be used to control the purity, selectivity, rate and mechanism of any process. Variables influencing the process for the incorporation of POMS into a material include polymer type and composition, polydispersity, molecular weight, and the composition of the POMS. A preferred approach is to match polymer system with that of the POMS and any associated additives (e.g. fillers, processing aids, catalysts, stabilizers, etc.) to obtain the desired physical properties. Finally, the kinetics, thermodynamics, and processing aids used during the compounding process are also tools of the trade that can impact the loading level and degree of enhancement resulting from incorporation of POMS into polymers. Blending processes such as melt blending, dry blending and solution mixing blending are all effective at mixing and alloying metallized nanostructured chemicals into plastics.

Example 1

Alloying POMS into Polycarbonate

A series of POMS were compounded into Bayer Makrolon® polycarbonate 2405 using a twin screw extruder. The POMS and polymer were dried prior to compounding to ensure a maximum state of alloying. After compounding, the POMS-reinforced samples were then molded into discs, dogbones and other test specimens and subjected to physical characterization. The optical characteristics of POMS polycarbonate is especially important to the application of polycarbonate as an optical resin. Optical properties were retained (e.g. in polycarbonate containing 2 wt % loadings of (a) [(PhSiO$_{1.5}$)$_4$(PhSiO$_2$)$_3$Al]Σ$_8$, (b) [(iBuSiO$_{1.5}$)$_4$(iBuSiO$_2$)$_3$SnCH$_3$]Σ$_8$, and (c) [(iBuSiO$_{1.5}$)$_4$(iBuSiO$_2$)$_3$B]Σ$_8$).

Furthermore incorporation of [(PhSiO$_{1.5}$)$_4$(PhSiO$_2$)$_3$Al]Σ$_8$ POMS into the polycarbonate increased its Youngs modulus by 6% without decreasing impact or thermal properties. POMS can be used in combination with POSS to improve properties other properties. For example, POSS incorporation into PC results in improved hardness and reduce penetration damage (Table 2).

TABLE 2

Nanomodulus, hardness, and penetration for POSS alloyed polycarbonate.

| Sample | Modulus (GPa) | Hardness (MPa) | Penetration Depth (nm) |
|---|---|---|---|
| PC (control) | 4.28 | 162.68 | 386.7 |
| 92% PC + 8% SO1458 [PhSiO$_{1.5}$)$_4$(PhSi(O)OH)$_3$]Σ7 | 7.28 | 237.95 | 312.7 |
| 92% PC + 8% MS0814 [PhSiO$_{1.5}$)$_7$(iOctylSiO$_{1.5}$)$_1$]Σ8 | 8.36 | 604.15 | 214.4 |

Figure 5:
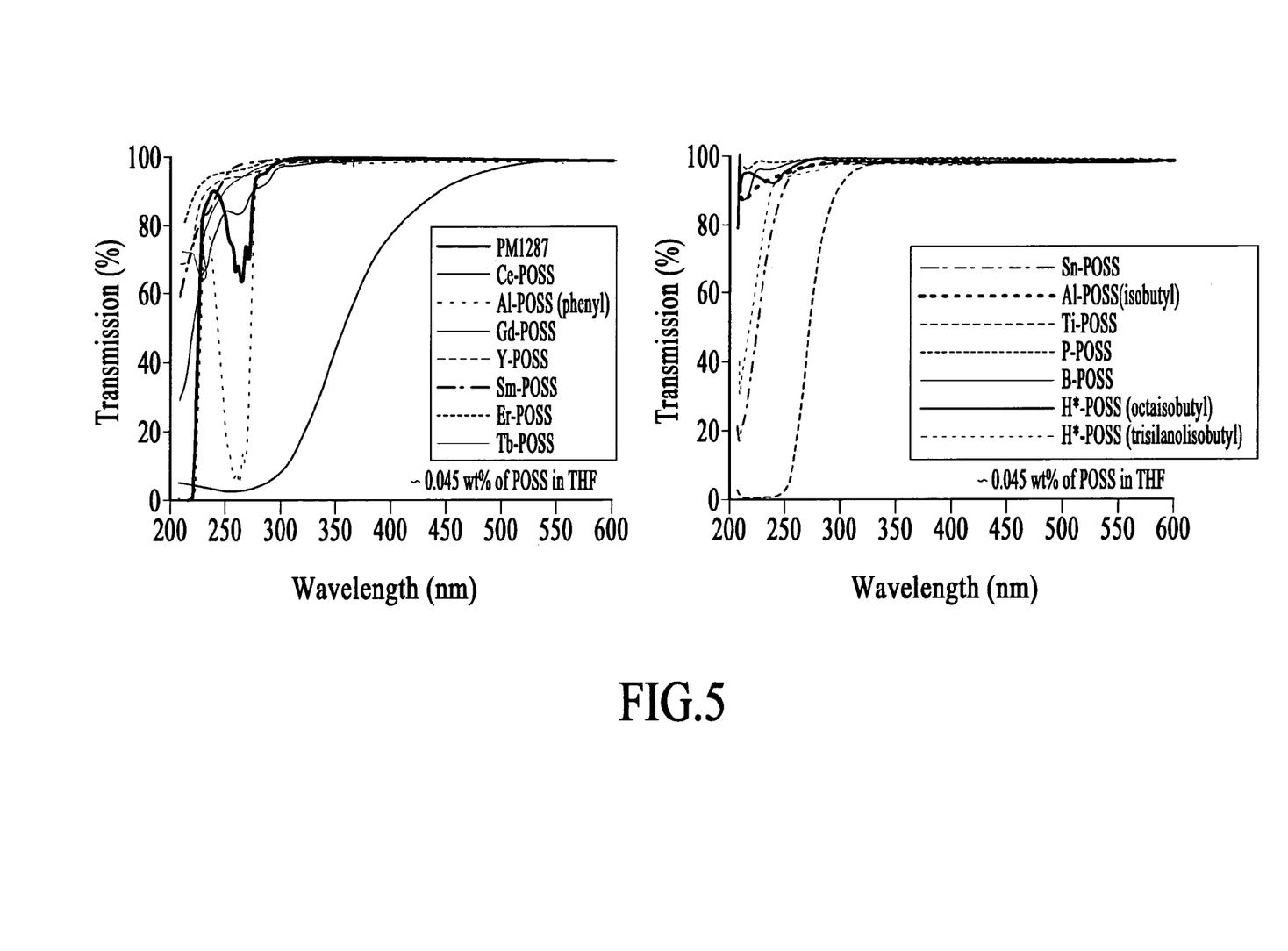
FIG. 5 shows transmission of ultraviolet and visible light through various $((RSiO_{1.5})_4(RSiO_2)_3M]\Sigma_8$ POMS.

Variations in compositions, sizes, and loading levels of POMS are observed to have a pronounced effect on the degree of various physical property enhancement. The mechanism for this enhancement is observed to be associated with the chain motion and free volume between the POMS and the polymer chain. Further, the incorporation of POMS provides for an enhanced hydrophobic surface which allows for improved hydrophobicity and weatherability of PC. Of special importance to polycarbonate has been the incorporation of POMS containing metals such as Cerium which provide for UV stabilization. Depending upon the wavelength desired to be absorbed the incorporation of metal atoms into POMS can be highly effective. For example the incorporation of cerium and titanium atoms into the corner of POMS can protect polymers against UV induced chain cleavage and discoloration (FIG. 5).

Example 2

Alloying POMS into Thermoplastics

Gadolinium POMS [(PhSiO$_{1.5}$)$_4$(PhSiO$_2$)$_3$Gd]Σ$_8$, [(iBuSiO$_{1.5}$)$_4$(iBuSiO$_2$)$_3$Gd]Σ$_8$ and Boron POMS [(PhSiO$_{1.5}$)$_4$(PhSiO$_2$)$_3$B]Σ$_8$, [(iBuSiO$_{1.5}$)$_4$(iBuSiO$_2$)$_3$B]Σ$_8$ were compounded into hot melt waxes using extrusion and single pot low shear blending techniques. The compatibility as evidenced by visual solubilization was found to range from 0.1 through 80 wt % into hot wax. Similar levels of compatibility were observed between POMS and other polymers. Compatibility of the nanoscopic entity with the polymer is critical to achieving property enhancements and reliable dispersion. For POMS the compatibility is controlled through the R group on the POSS/POMS cage, the type of functionality on the polymer and the amount of shear utilized in the mixing process. Table 3 summarizes wax-type thermoplastic polymers suitable for alloying with POMS.

TABLE 3

Waxes, Glues and Polymers Suitable for Alloying with POMS.

| Polymer type | Where Found | Melt Points |
|---|---|---|
| Raw paraffin (soft) | Canning wax, bulk wax | 46-52° C. |
| Votive candles (harder) | Barrels, cylinders up to 6 In. | 55-61° C. |

TABLE 3-continued

Waxes, Glues and Polymers Suitable for Alloying with POMS.

| Polymer type | Where Found | Melt Points |
|---|---|---|
| Hurricane lamp candles (hard) | Candleslicks, table candles, bulk | 68° C. or higher |
| Beeswax (waxy to hard) | Numerous candle styles, bulk | 63° C. or higher |
| General Purpose Hot Melt Glue | Barrels, bulk wax, FDA grades available | 81° C. or higher |
| Fast-Set Packaging Glue | Barrels, bulk wax, FDA grades available | 176° C., softens 91° C. |
| Dura-Tac High Strength Glue | Barrels, bulk wax | 168° C., softens 82° C. |
| Tuff-Tac High Performance Glue | Barrels, bulk wax | 193° C., softens 85° C. |
| Ultra-Tac Polyamide Glue | Barrels, bulk | t9t° C., softens t29° C. |
| PE Polyethylene | Barrels, bulk | t25° C., softens 79° C. |
| PMMA Polymethylmethacrylate | Barrels, bulk | t30° C., softens 90° C. |
| EVOH Polyethylvinylacohol | Barrels, bulk | t65° C., softens 55° C. |
| PP Polypropylene | Barrels, bulk | t65° C., softens t50° C. |
| PVDF Polyvinylideneflouride | Barrels, bulk | t7t° C., softens tt9° C. |
| POM Polyoxymethylene | Barrels, bulk | t75° C., softens 55° C. |
| PVC Polyvinylchloride | Barrels, bulk | t76° C., softens 8t° C. |
| COC Cycle Olefin Copolymer | Barrels, bulk | 225° C., softens 82° C. |
| PA Polyamide | Barrels, bulk | 250° C., softens 60° C. |
| PPE Polyphenylether | Barrels, bulk | 250° C., softens t20° C. |
| PET Polyethylene terephthalate | Barrels, bulk | 255° C., softens 72° C. |
| PSU Polysulfone | Barrels, bulk | 290° C., softens 88° C. |
| PFA Polyfluoroalkoxy copolymer | Barrels, bulk | 300° C., softens 90° C. |
| PEEK Polyethereketone | Barrels, bulk | 340° C., softens t40° C. |
| PC Polycarbonate | Barrels, bulk | 375° C., softens t45° C. |

The combination of polyamide, polyurethane, polyolefin and POSS and POMS into formulations are highly desirable as the polyamide and polyurethane provides broad adhesive properties, while the polyolefin provides low cost and low melting point. The POSS/POMS provides compatibility between the two resin systems and enhancement of physical properties. POSS/POMS is especially useful for improving chemical and oil resistance of the final formulation. POSS/POMS are also useful for improving the compatibility of the dissimilar polymer systems. Zhang et al. in 2002 reported that methacrylate POSS compatibilized polymethacrylate and polystyrene on the microscopic scale, 35 *Macromolecules* 8029-38 (2002). POMS has now been reduced to practice for the formulation of dissimilar polymer systems.

Most polymers, and especially polyamides and polyurethanes, are prone to oxidation and must be stabilized by antioxidants. Although stabilizer packages vary, the most common antioxidants utilized are hindered phenols, phosphites, phosphates, and hindered aromatic amines. The incorporation of POSS and POMS into polymers also promotes stabilization by controlling permeation/barrier characteristics as well as reactivity with oxidants. For example metals in the corner of POMS are oxophillic and react to form metal oxides. Therefore POSS and POMS can be utilized to obtain a synergy with conventional stabilizers and fragrances, pigments, dyes, and processing aids.

Figure 6:
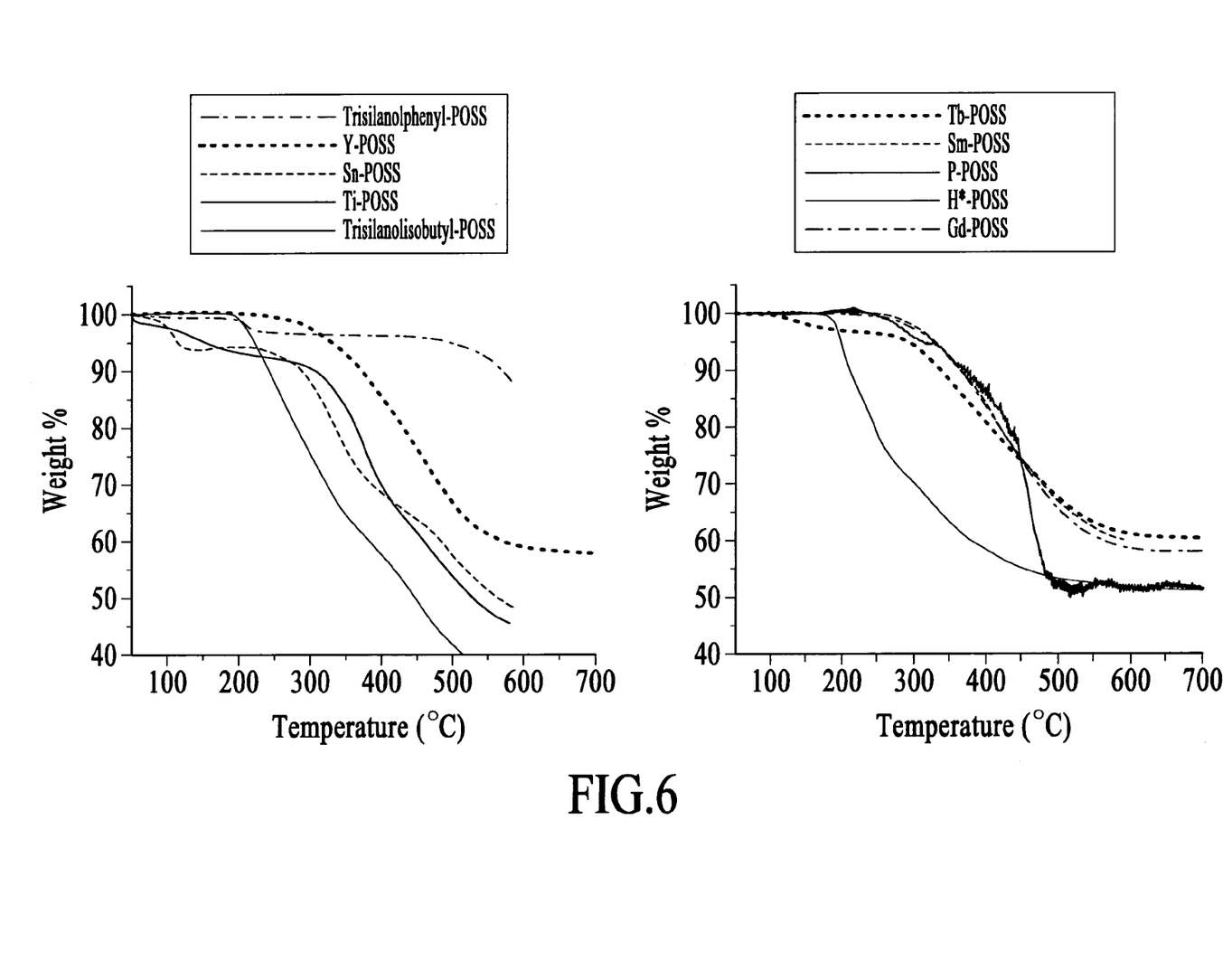
FIG. 6 contains thermogravimetric plots showing decomposition and char yields of $[(RSiO_{1.5})_4(RSiO_2)_3M]\Sigma_8$ POMS.

In accordance with the melting points for various thermoplastics, the thermal stability of POMS was examined to determine if the cage would undergo decomposition when incorporated into the molten polymer. The POMS were found to be unaffected by temperatures below 250° C. and could be extruded with the entire range of commercially available waxes and thermoplastics (FIG. 6).

B and Gd containing thermoplastics are highly desirable as coatings for shielding of electronic components against X-ray, thermal neutrons, protons and electrons.

Example 3

Alloying POMS into Thermosets

Figure 7:
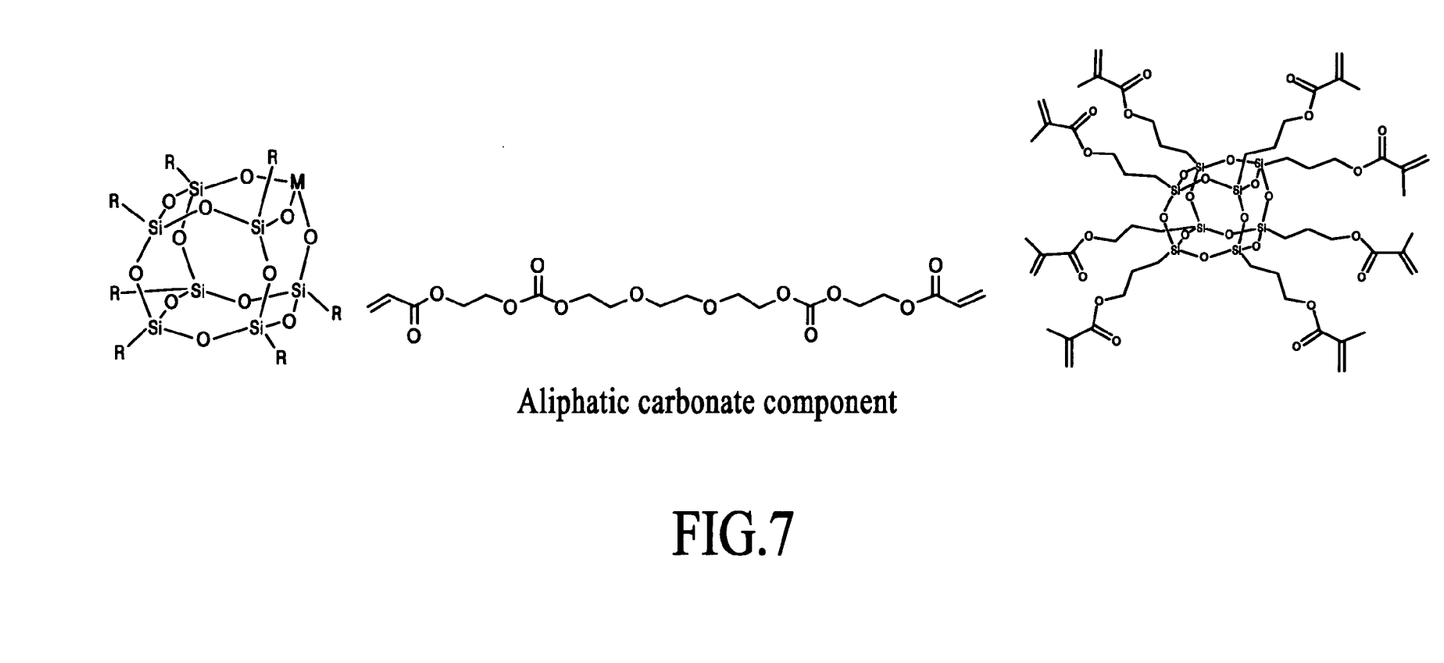
FIG. 7 shows components of an acrylic based Gd POMS thermoset coating.
Figure 8:
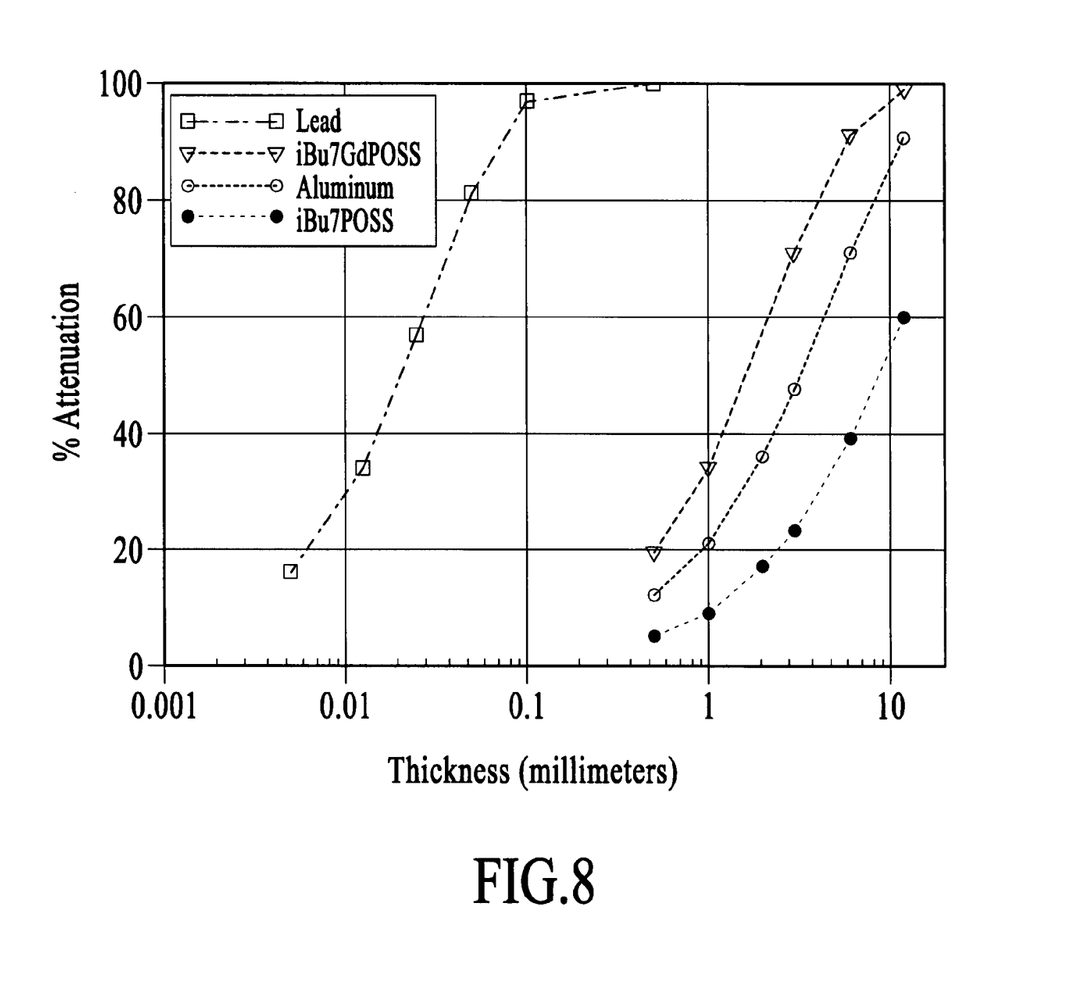
FIG. 8 shows a comparison of 40 wt % Gd POMS/Coating relative to Pb and Al X-ray shielding.

Aromatic $[(PhSiO_{1.5})_4(PhSiO_2)_3Gd]\Sigma_8$, and aliphatic $[(iBuSiO_{1.5})_4(iBuSiO_2)_3Gd]\Sigma_8$ along with aromatic $[(PhSiO_{1.5})_4(PhSiO_2)_3Al]\Sigma_8$, and aliphatic $[(iBuSiO_{1.5})_4(iBuSiO_2)_3Al]\Sigma_8$ were dissolved into aliphatic polycarbonate from loading levels of 0.1 to 70 wt % (FIG. 7). Optically clear mixtures and clear plaques were obtained for the aromatic POMS while the aliphatic POMS formed translucent mixtures. It was observed that higher loading of the POMS could be obtained by the co-incorporation of 5-15 wt % of [(Methacryloxypropyl$SiO_{1.5})_8]\Sigma_8$ POSS. The [Methacryloxypropyl$SiO_{1.5})_8]\Sigma_8$ behaves as a compatibilizing agent between the metal and the POMS in a similar manner to that reported by Zhang et al. for the compatibilization of two dissimilar polymer systems (demonstrated by the transparency of a Gd POMS thermoset coating containing 50 wt % $[(PhSiO_{1.5})_4(PhSiO_2)_3Gd]\Sigma_8$ and 5 wt % [(Methacryloxypropyl$SiO_{1.5})_8$] Σ8). The Gd containing thermoset is highly desirable as a conformal coating for shielding of electronic components against X-ray, thermal neutrons, protons and electrons.

Example 4

X-Ray Radiation Barrier In Crosslinked Coating

A series of X-ray absorption measurements were conducted on Gd POMS coatings to determine their effectiveness at providing shielding from X-ray radiation. The advantages of the Gd POMS coating is its ductility, rapid and low-cost coating method, light weight, and electrically insulative properties. The results confirmed the ability of the Gd POMS coatings to shield against 35 KeV X-ray. A tabulation of the findings is shown in Table 4.

TABLE 4

Shielding of 35 KeV X-ray.

| Composition | Sample Thickness | % Attenuation |
|---|---|---|
| Control resin | 2.03 mm | 15% |
| Control resin + 40% Gd POMS | 2.26 mm | 31% |
| Control resin + 40% Gd POMS | 4.51 mm | 52% |

Figure 10:
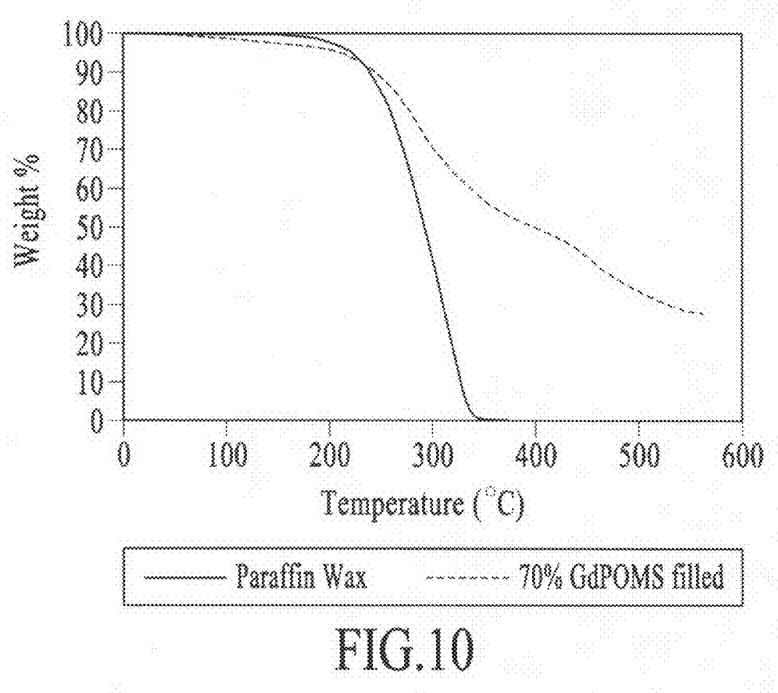
FIG. 10 is a thermogravimetric plot for paraffin wax-vs-70 wt % $[(iBuSiO_{1.5})_4(iBuSiO_2)_3Gd]\Sigma_8/30\%$ paraffin alloy.

A comparison of the shielding effectiveness relative to metallic lead and aluminum is shown in FIG. 10. The plot shows that Pb is opaque to X-rays, but the Gd POMS is as good as solid Al metal.

Example 5

Figure 9:
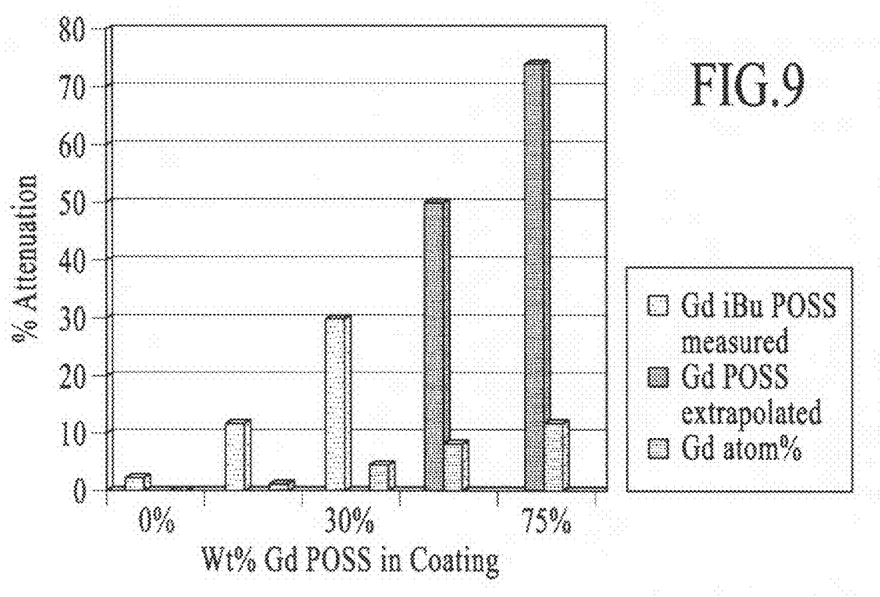
FIG. 9 illustrates the measured and calculated thermal neutron attenuation resulting from $[(iBuSiO_{1.5})_4(iBuSiO_2)_3Gd]\Sigma_8$.

Neutron Radiation Barrier in Thermoplastic Coating $[(iBuSiO_{1.5})_4(iBuSiO_2)_3Gd]\Sigma_8$ was compounded at various loading levels into a hydrocarbon resin system. A gold (Au) foil was sandwiched between two $[(iBuSiO_{1.5})_4(iBuSiO_2)_3Gd]\Sigma_8$ layers and the samples were then exposed to a nuclear reactor that provides a watt fission neutron spectrum (energy range: 1-20 MeV, Ave.: ~1 MeV). Only thermal (0.0253 ev) and epithermal (>0.5 eV) neutron flux were measured. The total neutron flux was measured using high purity gold foil. The reaction involved is Au-197(n,£^) Au-198. A cadmium cover was used to determine the thermal component of the total neutron flux. The absolute flux was determined from the measured induced activity in the gold foils. The reduction in neutron flux as a result of absorption by $[(iBuSiO_{1.5})_4(iBuSiO_2)_3Gd]\Sigma_8$ scaled linearly with the wt % of Gd POMS loaded into the resin (FIG. 9).

It was calculated that a ⅔ reduction in thermal neutrons penetrating into a semiconductor would be achieved from a 1 mm thick conformal coating containing 50 wt % natural abundance $[(iBuSiO_{1.5})_4(iBuSiO_2)_3Gd]\Sigma_8$. If isotopically enriched 157 Gd were incorporated into the POMS a ⅔ reduction of penetrating neutrons could be obtained by only a 0.1 mm thick coating. Similar results were obtained for boron and samarium POMS systems. Thus protection of electronic components from thermal neutron damage can be achieved using coatings containing B, Sm or Gd POSS additives.

A preferred method of incorporating Gd POMS onto a semiconductor is to alloy the Gd POMS into a hot melt wax adhesive and then cast this alloy into a suitable shape for application. For example the rods of the alloyed polymer can be incorporated into a hot melt glue gun and the Gd POMS/polymer can be applied directly over the bare chip or its dye and thereby fully protect it against ionizing thermal neutrons, X-ray, and moisture.

In addition to being utilized a shielding of electronic components, Gd and B POMS can also find application in fast neutron tumor therapy as they are effective at capturing neutrons and are compatible with soft tissue when R=iOctyl and with hard tissue when R=Phenyl.

Example 6

Metallized POSS for Improved Oxidative Stability

The incorporation of $[(PhSiO_{1.5})_4(PhSiO_2)_3Al]\Sigma_8$ into epoxy polymers was accomplished by the low shear mixing of $[(PhSiO_{1.5})_4(PhSiO_2)_3Al]\Sigma_8$ into the epoxide resin component in amounts ranging from 0.1 wt % to 40 wt % to obtain a clear solution.

Epoxy resins of Epon 162 with 20 wt % $[(glycidalSiO_{1.5})_8]$ $\Sigma_8$ are preferred. The alloyed resin is then mixed with curative and POMS catalyst (5 wt % $[(PhSiO_{1.5})_4(PhSiO_2)_3Al]\Sigma_8$) and the resulting resin was cast into plaques suitable for testing. The POSS alloyed and POMS catalyzed epoxy resin exhibit improved resistance to steam and ozone. After 100 ozone sterilization cycles, a total weight loss of 20% was observed for the POSS/POMS alloyed resin as compared to a 40% weight loss for the same system cured with imidazole curing agents. After 50 steam sterilization cycles, a total weight gain of 5% for the was observed for the POSS/POMS alloyed resin as compared to a 10% weight gain for the same system cured with commercial imidazole. Additionally the POSS/POMS alloyed resin retained its original optical clarity, texture, and bond strength relative to systems without the POSS/POMS. The incorporation of $[(PhSiO_{1.5})_4(PhSiO_2)_3Al]\Sigma_8$ into the epoxide resin served as an anitoxidant due to the electrophillic nature of the Al atom while the POSS cage was oxidized upon exposure to ozone and steam to form a nanoscopically thin surface glass that protected against further oxidation.

Example 7

POMS for Improved Fire Retardancy

The incorporation of $[(iBuSiO_{1.5})_4(iBuSiO_2)_3Al]\Sigma_8$ and $[(iBuSiO_{1.5})_4(iBuSiO_2)_3Al]\Sigma_8$ into polymers has been shown to be advantageous toward increasing the amount of char that forms during combustion of the polymer. Consequently less fuel reaches the combusting surface and a reduction in the heat release rate and even total heat can be realized. Theoretical and experimental work agrees that maximum retardation of oxidation and fire retardancy can be achieved through the incorporation of aluminum and silicon components into a surface char. Other oxophillic metals incorporated into the char are also effective at reducing surface oxidation.

In a similar manner the incorporation of $[(iBuSiO_{1.5})_4(iBuSiO_2)_3Gd]\Sigma_8$ into paraffin wax shows an improvement in fire retardancy as represented by slowing the rate of weight loss during heating. The thermogravimetric plot in FIG. 10 reveals that at 250° C. the pure paraffin loses all of its mass by melting and subsequent vaporization. In contrast to pure paraffin, the 70% $[(iBuSiO_{1.5})_4(iBuSiO_2)_3Gd]\Sigma_8$/30% paraffin alloy retains its mass to nearly 300° C. and at higher temperatures, loses mass at a much slower rate as a consequence of char formation.

While certain representative embodiments and details have been shown for purposes of illustrating the invention, it will be apparent to those skilled in the art that various changes in the methods and apparatus disclosed herein may be made without departing from the scope of the invention which is defined in the appended claims.

What is claimed is:

1. A method of compounding a metallized nanostructured chemical selected from the group consisting of polyhedral oligomeric metallosesquioxanes and polyhedral oligomeric metallosilicates into a polymer selected from the group consisting of acrylics, carbonates, epoxies, esters, silicones, polyolefins, polyethers, polyesters, polycarbonates, polyamides, polyeurethanes, polyimides, styrenics, amides, nitriles, olefins, aromatic oxides, aromatic sulfides, esters, and ionomers or rubbery polymers derived from hydrocarbons and silicones, comprising the step of compounding the metallized nanostructured chemical into the polymer by reactive or non-reactive blending.

2. The method of claim 1, further comprising compounding a nonmetallized nanostructured chemical selected from the group consisting of POSS and POS into the polymer.

3. The method of claim 1, wherein a plurality of metallized nanostructured chemicals is compounded into the polymer.

4. The method of claim 2, wherein a plurality of metallized nanostructured chemicals is compounded into the polymer.

5. The method of claim 4, wherein a plurality of nonmetallized nanostructured chemicals is compounded into the polymer.

6. The method of claim 1, wherein the polymer is in a physical state selected from the group consisting of amorphous, semicrystalline, crystalline, elastomeric and rubber.

7. The method of claim 1, wherein the polymer contains a chemical sequence and related polymer microstructure.

8. The method of claim 1, wherein the polymer is selected from the group consisting of a polymer coil, a polymer domain, a polymer chain, and a polymer segment.

9. The method of claim 1, wherein the metallized nanostructured chemical reinforces the polymer at a molecular level.

10. The method of claim 1, wherein the compounding is nonreactive.

11. The method of claim 1, wherein the compounding is reactive.

12. The method of claim 1, wherein a physical property of the polymer is improved as a result of incorporating the metallized nanostructured chemical into the polymer.

13. The method of claim 12, wherein the physical property is selected from the group consisting of adhesion to a polymeric surface, adhesion to a composite surface, adhesion to a metal surface, water repellency, density, low dielectric constant, thermal conductivity, glass transition, viscosity, melt transition, storage modulus, relaxation, stress transfer, abrasion resistance, fire resistance, biological compatibility, gas permeability, porosity, optical quality, and radiation shielding.

14. The method of claim 1, wherein the compounding is accomplished by blending the metallized nanostructured chemical into the polymer.

15. The method of claim 14, wherein the compounding is accomplished by a blending process selected from the group consisting of melt blending, dry blending, and solution blending.

16. The method of claim 1, wherein the metallized nanostructured chemical performs at least one function selected from the group consisting of plasticizer, filler, compatabilizer, antioxidant, and stablizer.

17. The method of claim 2, wherein the metallized and nonmetallized nanostructured chemicals function as compatibilizers.

18. The method of claim 1, wherein the metallized nanostructured chemical is selectively compounded into the polymer such that the metallized nanostructured chemical is incorporated into a predetermined region of the polymer.

19. The method of claim 18, wherein a physical property is enhanced as a result of compounding the metallized nanostructured chemical into the polymer.

20. A method according to claim 19, wherein the property is selected from the group consisting of $T_g$, HDT, modulus, creep, set, and permeability.

* * * * *